United States Patent [19]

Wnek

[11] 4,082,195

[45] Apr. 4, 1978

[54] HANDLING SYSTEM FOR HEAVY LOADS

[75] Inventor: Alfred B. Wnek, Livonia, Mich.

[73] Assignee: Ex-Cell-O Corporation, Troy, Mich.

[21] Appl. No.: 698,445

[22] Filed: Jun. 21, 1976

[51] Int. Cl.² .............................................. B60P 1/60
[52] U.S. Cl. ................................ 214/38 BA; 180/119;
 180/125; 214/38 D; 214/512; 214/517; 254/2 C
[58] Field of Search ............. 214/38 B, 38 BA, 38 D,
 214/515, 517, 620, 621, 1 BE, 512; 254/93 R, 93
 HP, 2 R, 2 C; 180/119, 121, 125

[56] References Cited

U.S. PATENT DOCUMENTS

| | | | |
|---|---|---|---|
| 1,933,211 | 10/1933 | Flowers | 214/38 BA |
| 2,796,186 | 7/1957 | Arnot | 214/621 |
| 3,185,238 | 5/1965 | Coates | 180/125 |
| 3,202,232 | 8/1965 | Rogers | 180/119 |
| 3,220,585 | 11/1965 | McCartney et al. | 214/512 |
| 3,419,164 | 12/1968 | O'Neill | 214/38 D |

*Primary Examiner*—Robert G. Sheridan
*Attorney, Agent, or Firm*—James H. Bower; Frank D. Risko

[57] ABSTRACT

A material handling system incorporating an air operated scissors lift mounted on an air bearing pallet to move heavy or cumbersome loads. On top of the upper platform is a second air bearing pallet channelled so it can move in a guided path for use with a transition plate for transferring, loading and unloading heavy loads onto or from a truck bed or from a shelf or rack especially designed to support and handle heavy loads.

10 Claims, 4 Drawing Figures

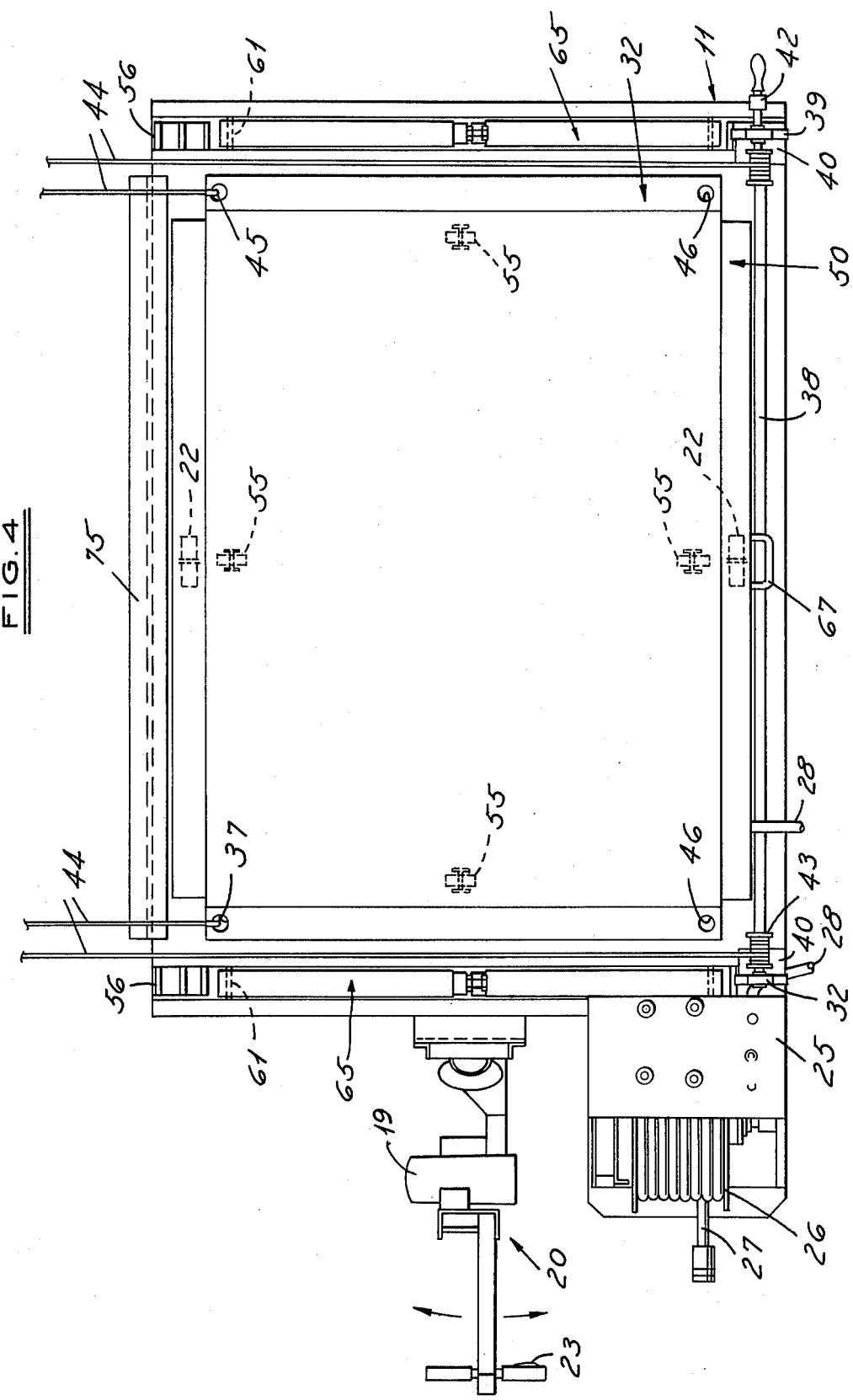

HANDLING SYSTEM FOR HEAVY LOADS

BACKGROUND OF THE INVENTION

1. Field of the Invention

An omni-directional material or load handling transporter device having a lower air film transport and support mechanism utilizing a scissors principle to raise and lower the upper platform on which is supported a second air film transfer platform.

2. Description of the Prior Art

In the material handling field all types of devices are used to move or relocate heavy or bulky objects. Fork lift trucks and overhead cranes are the two most popular devices to move heavy, bulky or palletized loads.

It is commonplace that cranes and fork lift trucks have heretofor been used in the loading and unloading of molds or dies in large horizontal type presses such as used in the injection molding or die casting industry. Here the molds or dies are moved and raised into position by a fork lift truck or by a bi-directional overhead crane. In many cases the ceiling room or overhead clearing is restricted and extraordinary and sometimes dangerous methods are used to install a die or mold into place in a machine. In many cases a mold can weigh as much as 50,000 pounds and can cause difficulty when being moved into place by a fork-lift truck, for example. The load must be raised and positioned between the plates of the machine and with such an overhung load hanging on the forks, an unstable condition in equilibrium of the truck can occur.

A device such as described in the Flipse U.S. Pat. No. 3,124,209 uses an air bearing pallet to move heavy loads, in this case ship cargo or heavy truck cargo from load areas to a truck bed with or without the aid of a fork lift truck.

In other fields, such as the die casting or plastic molding field, where heavy dies or molds must be moved between various locations e.g. mold storage, assembly and repair, as well as to and from machinery which additionally require raising and lowering the heavy loads to permit set-up and mounting operations, such devices have not been explored. A patent issued to Tezuka U.S. Pat. No. 3,457,874 did use pressured air trapped in pockets under a die set to move such set into position. However, the movement of large dies or mold such as used in the casting or injection molding industry have not been used.

SUMMARY OF THE INVENTION

This invention incorporates dual air films or air bearing principles in conjunction with an air operated scissors lift to allow removal of a heavy mold, for example, from a storage location and transport this mold to a machine, such as a die casting or injection molding machine, then transfer, and install the mold into the machine. The primary air bearing, control mechanism and scissors device are contained in our structure with the secondary air bearing and transfer platform floated on top of the scissors structure. A transition plate is used between the storage shelf and the scissors structure so the secondary transfer platform can be floated off the structure onto the storage shelf, air bearings deflated and then returned to the scissor structure on integral casters.

It is an object of this invention to guide the secondary platform within fixed channels on the top of the scissor structure.

It is another object to have a winch and strap mechanism to aid in moving, while floating, the secondary transfer platform.

It is a further object of the invention to have guide wheels on the main structure to aid in controlling the direction of movement of the device.

It is another object of this invention to have at least one pivotal guide wheel to drive and control the transporter movements.

It is a final objective of the invention to use either a factory air supply or a self-contained air supply from a compressor and accumulator unit to power this omni-directional transporter.

BRIEF DESCRIPTION OF THE DRAWINGS

FIG. 4 is a plan view of the material handling unit.

DESCRIPTION OF PREFERRED EMBODIMENTS

Figure 1:
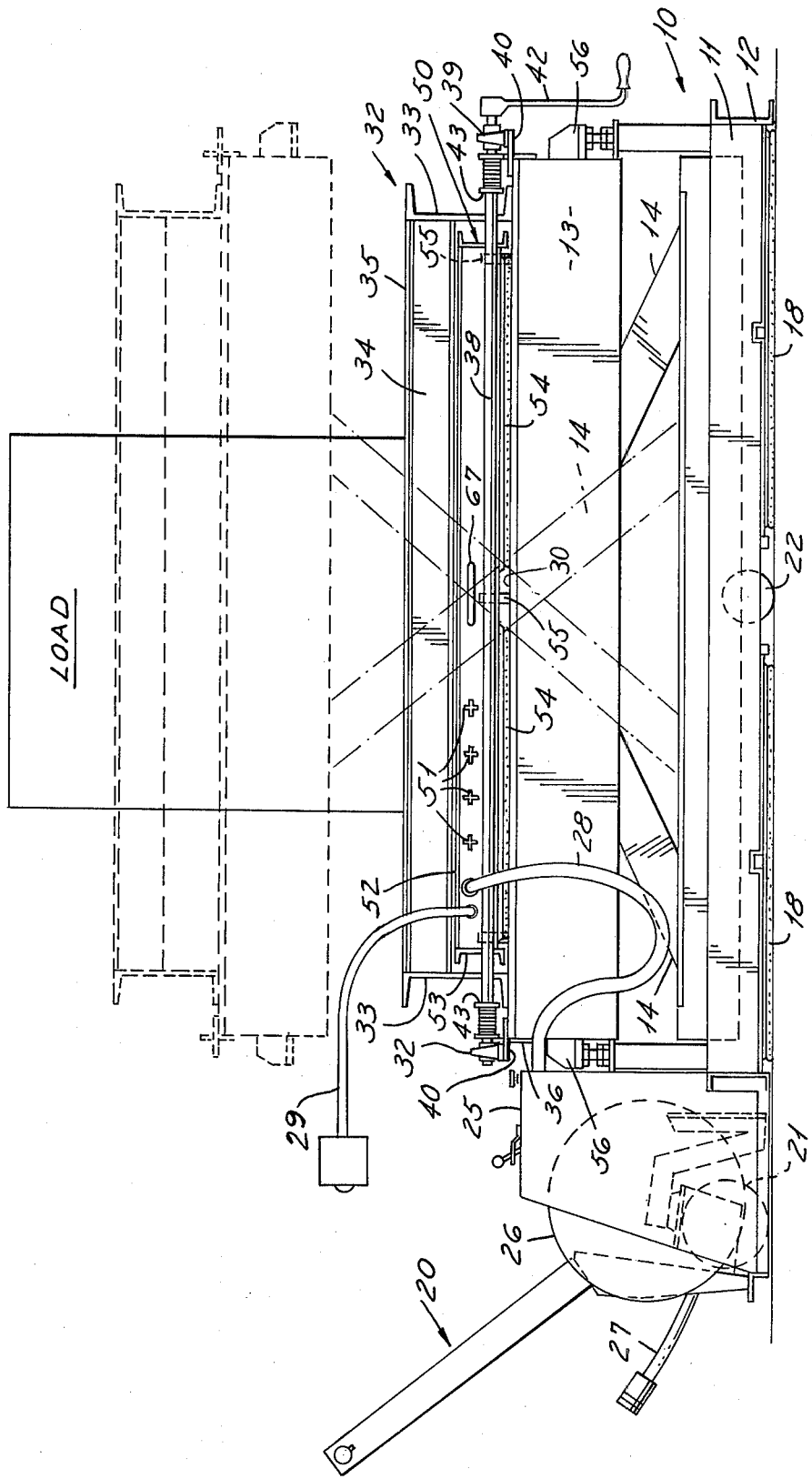
FIG. 1 is a side view of the unit showing the pallet on the upper platform in a lower and upper position.

The handling system shown in FIG. 1 consists of two basic units. The lower unit which will be called the transporter 10 and an upper unit called the transfer platform 50. The transporter 10 is made up of four major sections. The base 11 is composed of channel shaped sections 12 which are welded or bolted to a commercially available scissor lift 13 sold under the commercial tradename "Torklift" manufactured by American Industrial or under the tradename "Titan" manufactured by Auto-Quip. This scissor lift 13, scissor arms 14 and fluid rams 15 can best be seen in FIGS. 2 or 3.

Four commercially available air bearings 18 such as manufactured by Airfloat Corp. with commercial reference #A17-2838 are affixed to transporter base 11. These air bearings are easily removeable and operate on compressed air from 5 to 30 psi and each is capable of supporting a load of from 4,250 to 25,500 pounds capacity. The four air-bearing operating at approximately 15 psi will support a load of approximately 50,000 pounds total capacity.

An air motor drive tractor assembly 20, also commercially available from Airfloat Corp. catalogue number SD-1, having a single wheel 21 is used to provide movement and to control the direction of motion of the transporter 10. The drive motor handle 23 controls the wheel 21 and inflation of air bearings 18. Additional wheels 22 are located toward the outside and center of the transporter 10 and affixed to the base 11 for better tracking and overall control. A control panel 25 mounted atop a modified Croft hose reel 26 is used to regulate the air supply to the transporter air bearings, drive motor and scissor lifting device. The air drive motor assembly 20 is capable of pivoting about the drive wheel vertical axis for controlling the direction movements of the transporter. Hose assembly 27 is stored on hose reel 26 and conveys all the necessary supply air for operating the air drive motor, scissors lift, and platform air bearings. A short hose assembly 28 is connected between control panel 25 and transfer platform 50 which will be described in detail later. Also connected to platform 50 is remote control cable 29 which is used to control the air flow into the transfer platform 50 air bearing.

The scissor lift surface 30 is especially finished so that it can accommodate the air bearing associated with transfer platform 50. A slave pallet 32 rests on surface 30 and this pallet consists of support channels 33, several cross beams 34 and pallet surface 35 on which the load, shown in FIG. 1, is placed.

Transfer platform 50 is a framed structure of channels 53 boxed to contain four air bearings 54 best seen in FIG. 1 which are removeably mounted inside. Each air bearing is controlled by an air flow valve 51 which can selectively regulate the amount of air going into each air bearing. Four casters 55, shown in FIG. 4 are mounted on the transfer platform.

Figure 2:
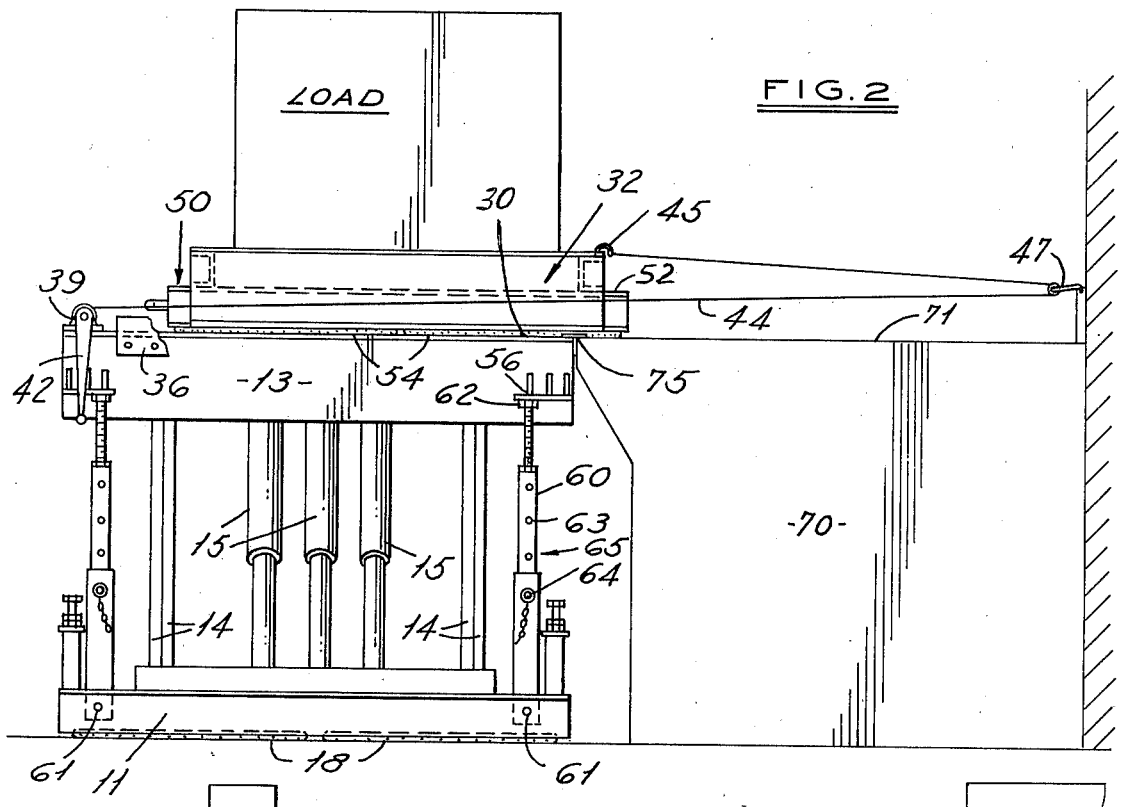
FIG. 2 is a view showing the unit in position next to a storage shelf.

A dual strap winch best seen in FIGS. 1 and 2 is affixed to an edge of the scissor lift surface 30. This winch consists of shaft 38 held in journal bearings 39 mounted on each end of the lift surface on brackets 40. The shaft 38 extends beyond the journal 39 on one end to which is fastened handle 42. Take up reels 43 are fixedly attached to shaft 38 on which strap 44 can be wound. A hook 45 is attached to the free end of strap 44 with a pulley assembly 47, shown in FIG. 2, through which the strap 44 passes when used in transferring loads onto or from a storage shelf.

A guide rail 36 is affixed to scissor lift frame 13 on each side to aid in containing the movement or transfer platform 50. Four brackets 56 are fixedly attached to scissor lift frame 13 with two each on opposite sides to support frame 13 in the de-energized position by riser 58 and adjustable bolt 59 best seen in FIG. 3. The riser 59 is secured to the base 11. Adjustable and telescoping stanchions 60 are moveably fastened to base 11 by pin 61 and also has an adjustable bolt 62 for additional adjustments in height. Holes 63 are spaced on the extensible portion of stanchion 60 which is held in its adjusted position by pin 64. When not in use these stanchions 60 are pivoted down into base 11. Riser 58 acts also as a stop when stanchion 60 is pivoted into its upright vertical position.

OPERATION

The transporter 10 can be used in a number of different applications and as will be discussed extends and innovates the use of air bearing devices as described in the art. In my invention the transporter 10 shown in FIG. 1 is connected through hose assembly 27 to a supply of compressed dry shop air which normally is at 90 psi and having a flow of 120 cubic feet per minute. The control panel has valving and switches which allow the compressed air to flow to the various components of the transporter 10. To best understand my invention an example of use with a preferred embodiment will be presented. The air bearings 18 are filled with air from the shop supply via hose assembly 27 regulated to 13 to 15 psi and through valving in control panel 25. This panel also contains valves which control the flow of air to each of the four air bearings 18 individually so that a load that is nonsymetrical with the transporter can be balanced by increasing or decreasing the flow of air to the respective air bearing. Once the bearings have been inflated the transporter can be moved omni-directionally across the floor or work surface. It should be noted that in order for an air bearing to operate properly the surface over which it will ride must be very smooth and preferably sealed with a hard painted or epoxy finish.

The movement of the transporter now could easily be accomplished by simply pushing the transporter where you would want it to go. However, the control of direction is not good because of the very nature of the air bearings and inertia of the load. They will tend to move easily once started but stopping and positioning can be difficult. An air motor drive tractor 20 is shown in FIGS. 1 and 4 shown pivotally affixed to one end and has a wheel 21 which is coupled to the drive motor 19. Control handle 23 regulates the speed and direction of the wheel 21 which now gives the operator the ability to push and direct the movement of the transporter 10 with great ease and with very good control. Additional wheels 22 are provided at each side which eliminate undersireable side slip or movement.

Shown in FIG. 1 is a load atop the transfer platform 50 with dotted lines to show the movement of the scissor lift frame 13 to the upper position.

Figure 3:
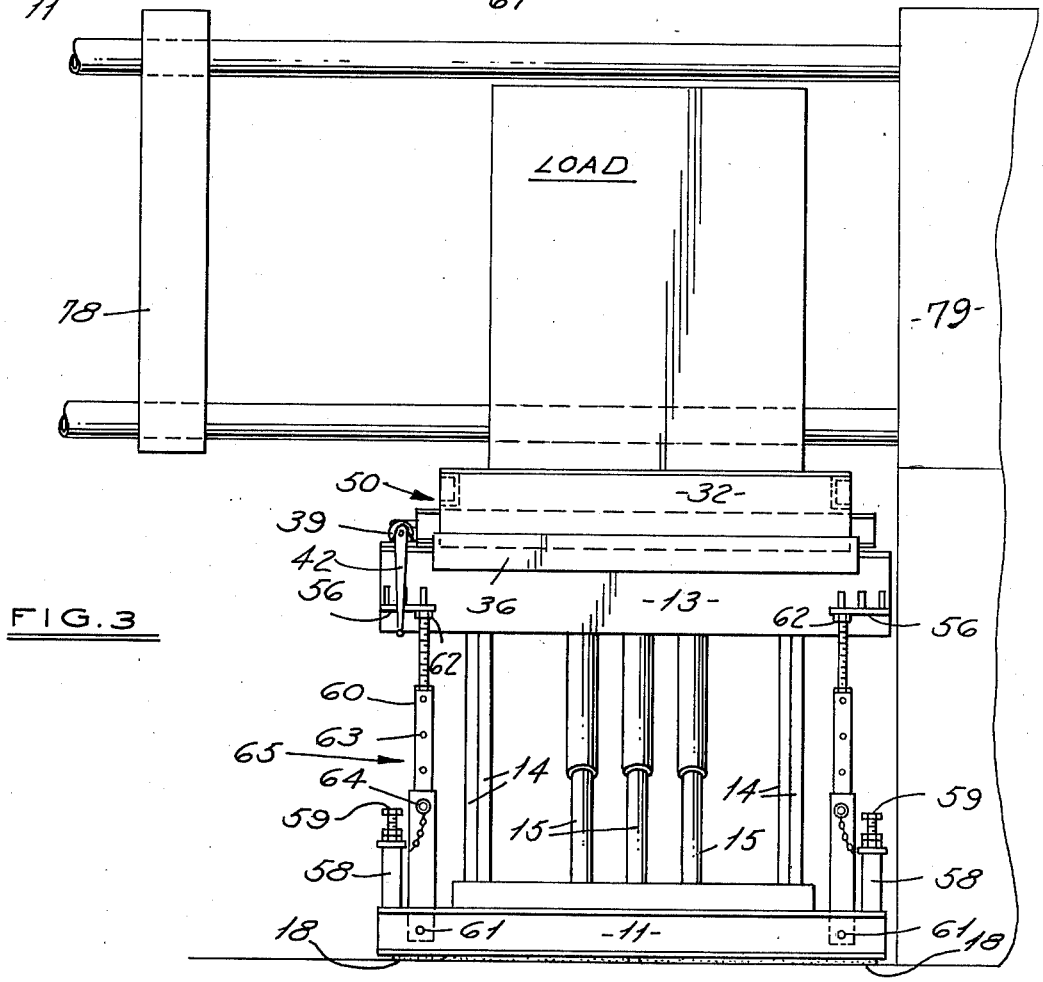
FIG. 3 is a view showing the unit in position in a typical horizontal press.

The movement of the frame 13 and scissor arms 14 are accomplished by the fluid rams 15 and are best seen in FIGS. 2 and 3. These rams can be operated by either air or hydraulic power. The control of the height to which the frame will lift is controlled from panel 25. Once the proper height has been reached, stanchion assembly 65 is pivoted about pin 61 into place. This assembly has telescoping stanchion extension 60 with holes 63 for coarse adjustment of the height of the support and is held in the upward position by pin 64. When the stanchion assembly is upright, it stops against riser 58. Bolt 62 is adjusted to engage bracket 56 for final positioning. This is obviously done for all four corners of the transporter 10. When this is complete the load may be shifted to any extreme on the scissors load bearing surface 30 without damage to the scissors lift components. Also when the transporter is in final position, the air flow to the transporter air bearing 18 is turned off by merely releasing the control on the drive motor handle 23.

In some manufacturing situations, the storage of heavy dies or molds may be facilitated by storing these bulky loads on a special platform, rack or shelf 70 such as shown in FIG. 2. FIG. 2 illustrates an example of a load being prepared to be moved off the transporter 10 to storage shelf 70. A transition plate 75 is shown between the transporter lift surface 30 and the shelf surface 71 which bridges the space between the two surfaces. Also it is not then necessary to have both of these surfaces in exact allignment.

Now the transfer platform 50 will have its air bearings 54 energized. This air is supplied from the main factory air supply through the control panel 25 to connecting hose assembly 28 through the valves 51 (shown in FIG. 1) to each bearing. The valves 51 control the amount of air flow of each of the four bearings 54 so that uneven or unbalanced loads or surfaces can be accomodated. Increasing or decreasing the air flow can be easily effected this way. Remote control cable 29 actually controls the flow of air to the platform 50. When the air bearings are inflated, surface 52 of transfer platform 50 will contact the bottom surfaces of cross beams 34 of slave pallet 32 which will raise the slave pallet 32 up off scissor lift surface 30 and hence elevate the load. Now the load can be moved across transition plate 75 onto surface 71. Here again the movement of the load would be difficult to initiate so a dual strap winch is provided to assist in moving the load off the transporter 10, see FIGS. 2 and 4. Strap 44 is wound on reel 43 which is connected to shaft 38. The strap is passed over pulley 47 which is affixed to shelf surface 71 or the wall adjacent to said surface to act as a pivot for the strap which is attached to slave pallet 32 by hook 45 passing into holes 37 of slave pallet. With a strap connected on each side of the slave pallet 32 and with air bearing 54 energized, the rotation of shaft 38 by handle 42 in a CCW direction will now wind the strap around reel 43 and cause a pulling of the slave pallet 32 held up off the transporter by the transfer platform 50. The hose 28 is long enough to allow the transfer platform to move onto surface 71 completely. The slave pallet 32 and the load would be left to remain on the shelf 70 by deflating the transfer platform air bearings 54. The platform 50 can now be removed by pulling on handle 67 and platform 50 will roll on its own casters 55 from under the slave pallet and back onto the transporter lift surface 30.

To move a load from the shelf 70 to the transporter the strap 44 would be connected to holes 46 in the slave pallet 32 to pull the load back onto the transporter 10. Guide rails 36 are provided on each side of the lift surface to prevent skewing of the transfer platform 50 as it is pulled off or onto the shelf or transporter. Additional telescoping rails (not shown) are extended to guide the slave pallet 32 after it is off the transporter and on the shelf. A similar arrangement could be used to transfer a load from the bed of a truck, for example, in place of the shelf with the only criteria being that the truck bed surface be covered with linoleum, sheet steel or other material to provide a surface smooth enough to accommodate the air bearing requirements of the transfer platform.

FIG. 3 shows the transporter 10 with a load ready for movement into a horizontal type press. The load in this case would be a mold or die. The moving plate 78 of the clamp would slide forward and the mold would be attached by conventional means to the moving plate 78. The stanchion 60 would be removed, the scissor lift 13 lowered out of the way and the moving plate 78 would now be moved to allow the mold to contact stationary plate 79 and affixed to it by conventional means and the tie straps now removed from the mold to allow it to open and the machine to become functional. Obviously the reverse would take place when removing a mold or die from the machine.

This invention therefore incorporates a first air bearing transporter in conjunction with a second air bearing transfer platform to move a bulky load from the transporter to a storage area or into a machine which utilized such apparatus. In addition a scissor lift is used to raise and lower the load as well as a drive wheel for easily controlling the movement of the transport to any desired position.

This invention may be embodied in several forms without departing from the spirit or characteristics thereof. The scope of the invention is defined by the appended claims and minor changes may be made which are equivalent thereof and such changes are therefore intended to be included in those claims.

I claim:
1. An apparatus for handling heavy or bulky loads which are to be transferred from one location to another wherein said apparatus comprises:
    (a) a base means having a first plurality of air bearing means affixedly attached therein interacting with a supporting surface;
    (b) a first platform means affixed to a fluid powered ram operated scissors lift means wherein said lift means is fixedly attached to said base;
    (c) a second platform means having a second plurality of air bearing means affixed therein coacting with said first platform means wherein said second platform means;
    (d) a fluid power means connected to a control and distribution means to operate said first and second air bearing means; and
    (e) adjustable support means pivotally affixed to said base means and cooperating with said first platform means.
2. The apparatus of claim 1 wherein a drive motor and wheel are pivotally affixed to said base.
3. The apparatus of claim 2 wherein a winch means is fixedly attached to said first platform means wherein said winch interacts with said second platform.
4. The apparatus of claim 3 wherein said winch means interacts with a pulley means remote to said base means.
5. The apparatus of claim 1 wherein guide rail means are affixedly attached to said first platform wherein said rail means cooperate with said second platform.
6. The apparatus of claim 1 wherein said fluid power means is compressed air.
7. The apparatus of claim 1 wherein said fluid powered means to each said air bearing means is individually controlled.
8. The apparatus of claim 3 wherein guide rail means are affixedly attached to said first platform wherein said rail means cooperate with said second platform.
9. The apparatus of claim 2 wherein additional wheel means are affixed to said base means.
10. The apparatus of claim 1 wherein wheel means are affixed to said second platform means.

* * * * *

UNITED STATES PATENT OFFICE
CERTIFICATE OF CORRECTION

Patent No. 4,082,195             Dated April 4, 1978

Inventor(s) Alfred B. Wnek

It is certified that error appears in the above-identified patent and that said Letters Patent are hereby corrected as shown below:

Column 6, line 22, after "form" insert -- can move independently of said first platform --.

Signed and Sealed this

Eighth Day of August 1978

[SEAL]

Attest:

RUTH C. MASON
*Attesting Officer*

DONALD W. BANNER
*Commissioner of Patents and Trademarks*